(12) United States Patent
Clark et al.

(10) Patent No.: US 12,387,713 B2
(45) Date of Patent: Aug. 12, 2025

(54) ADAPTING SETTINGS OF A FOLDABLE DISPLAY FOR FACILITATING TRANSLATION OF MULTILINGUAL CONVERSATIONS

(71) Applicant: GOOGLE LLC, Mountain View, CA (US)

(72) Inventors: Nicholas Clark, London (GB); Gustav Sennton, Newquay (GB); Xinxing Gu, Sunnyvale, CA (US); Vincent Lacey, Mountain View, CA (US); David Wilson, Bangor (IE); Shaun Post, San Mateo, CA (US); Chris Kau, Los Altos, CA (US); Petr Cermák, London (GB); Michael Anthony Schuler, San Francisco, CA (US); Nicole McWilliams, London (GB); Will Osborn, London (GB); Daniel Lee, San Francisco, CA (US); Sanatt Abrol, London (GB); Pragya Bajoria, London (GB); Alan Wong, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 216 days.

(21) Appl. No.: 18/131,807

(22) Filed: Apr. 6, 2023

(65) Prior Publication Data
US 2024/0339109 A1 Oct. 10, 2024

(51) Int. Cl.
*G10L 15/00* (2013.01)
*G06F 1/16* (2006.01)

(52) U.S. Cl.
CPC .......... *G10L 15/005* (2013.01); *G06F 1/1616* (2013.01); *G06F 1/1686* (2013.01)

(58) Field of Classification Search
None
See application file for complete search history.

(56) References Cited

U.S. PATENT DOCUMENTS

| | | |
|---|---|---|
| 10,061,771 B1 | 8/2018 | Zhang |
| 2010/0161310 A1 | 6/2010 | Chao |
| 2012/0310622 A1 | 12/2012 | Zivkovic et al. |
| 2023/0367392 A1* | 11/2023 | Ross ...................... G06F 1/163 |

* cited by examiner

*Primary Examiner* — Quynh H Nguyen
(74) *Attorney, Agent, or Firm* — Gray Ice Higdon

(57) ABSTRACT

Implementations set forth herein relate to an automated assistant and/or other application that can adapt settings of a foldable display interface of a computing device according to user interactions occurring during a multilingual conversation. During the multilingual conversation between at least two users, translated content of the conversation can be rendered at a portion of the display interface according to which user is actively speaking. When a user is actively speaking, a brightness level of a portion of the display interface that is facing another user in the conversation can be modified to emphasize that the user is speaking and that the translated content is being rendered. When the user who is speaking is also the owner of the computing device, a portion of the display interface that is facing the other user can exhibit a limited responsiveness to touch inputs.

20 Claims, 6 Drawing Sheets

ADAPTING SETTINGS OF A FOLDABLE DISPLAY FOR FACILITATING TRANSLATION OF MULTILINGUAL CONVERSATIONS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

SUMMARY

Implementations set forth herein relate to limiting and/or facilitating certain functionality of a foldable display device that is being utilized for translating a conversation between at least two persons that are speaking two different natural languages. The foldable display device can be a portable computing device, such as a cellular phone, that can be arranged in a partially folded, or unfolded, manner such that two persons, who are facing each other, can each view a respective portion of a display interface of the foldable display device. In some implementations, when being utilized for translations, the computing device can cause a first display portion to operate in a touch-enabled mode and a second display portion to operate in a touch-disabled mode. The first display portion can be a portion of a display interface that is determined to be facing the owner of the computing device and the second display portion can be another portion of the display interface that is determined to be facing another person (e.g., a person that the owner is talking to). In this way, the owner of the computing device can still interact with their device during the conversation with the other person, and the other person can have limited (or no) ability to control the computing device. This can promote security in circumstances in which the owner is chatting with a stranger in public, and is therefore reasonably not sure how the other person will respond to the owner utilizing their computing device to assist with translations.

In some implementations, when a user is utilizing their foldable computing device to perform translations, one or more cameras of the computing device can be utilized to assist with isolating speech of another person that the user is speaking with. This can be particularly useful in circumstances in which the user is speaking with another person in a public space in which multiple other users are present. For example, audio capturing other speech of the other person can be processed to eliminate any background noise (e.g., sounds made by one or more other persons not participating in the conversation) before translating any natural language content of the speech. In furtherance of accurately removing background noise, one or more cameras of the computing device can be utilized to determine the portions of the captured audio that correspond to moments in which the other person was actually talking. For example, images and/or videos captured by a camera of the computing device can be processed to identify durations of time in which the other person was performing a motion with their mouth while audio, having a threshold amplitude, was also being captured. These durations of time can be utilized to filter certain aspects of intervening durations of audio in which the other person was not talking, thereby mitigating any opportunities for background noise to affect translations. In some implementations, images and/or video from multiple cameras of the computing device can be utilized for filtering out noise from behind a person that is speaking and from in front of the person that is speaking. In this way, persons relying on the computing device to provide translations for their conversation can receive more accurate translations as a result of the audible speech being suitably refined for translations.

In some implementations, the computing device can communicate with another device for soliciting the other device to assist with at least some aspects of translating the conversations between the user and the other person. This can optionally be performed in circumstances when the computing device has limited battery charge, and in combination with other power-saving techniques. In some implementations, the other device can be computerized glasses worn by the user or the other person, and the computing device can communicate with the computerized glasses via Bluetooth, Wi-Fi, cellular, images, text, audio, and/or any other medium for communicating between devices. For example, when the computing device is assisting with translations, a camera of the computing device can capture an image of the user and/or the other person in the conversation (with prior permission from the other person) and determine, from the image, that the user and/or other person are wearing the computerized glasses. Based on this determination, the computing device can cause a QR code to be rendered at the second portion of the display interface that is facing the other person. A camera of the computerized glasses can scan the QR code and retrieve, from a secured server, settings data (e.g., language data that indicates one or more natural languages being utilized during the conversation) for allowing an application of the computerized glasses to facilitate further translations during the conversation between the user and the other person. For example, a textual translation of speech of the user can be rendered at the display interface of the computerized glasses, thereby allowing the other person to understand the user. When the textual translations are being rendered at the computerized glasses, the computing device can cause the second portion of the computing device to dim or otherwise no longer display content, thereby preserving power and/or other computational resources of the computing device.

In some implementations, the display interface of the computing device can be adjusted according to whether the user or the other person is speaking. For example, while the computing device is providing translations of speech of each participant, the computing device can cause the display interface to be a particular brightness. However, when no participant has been speaking for a threshold duration of time, the display interface can decrease in brightness and/or remain at a constant brightness until a participant is determined to be speaking again. Alternatively, or additionally, when no participant has been speaking for a separate threshold duration of time, the display interface can cause the second portion (e.g., the portion facing the other person) of the display interface to dim further. In this way, the first portion of the display interface can remain bright enough for the user to still see any notifications or other content at the first portion of the display interface that may be important. For example, a user can be provided with a microphone interruption notification when a microphone of the computing device is determined to be occluded, or otherwise experiencing an obstruction, during the conversation. Determining that the microphone is being obstructed in this way can involve processing audio and/or image data during the conversation between the user and the other person. When the microphone is determined to be occluded, the computing device can cause a notification to be rendered at the first portion and/or the second portion of the display interface, according to how the computing device has predicted the microphone to be occluded. For example, an image captured by a camera of the computing device can indicate that the user is likely gripping the computing device in a way that occludes the microphone and, in response, can cause the microphone interruption notification to be rendered at the first portion of the display interface.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
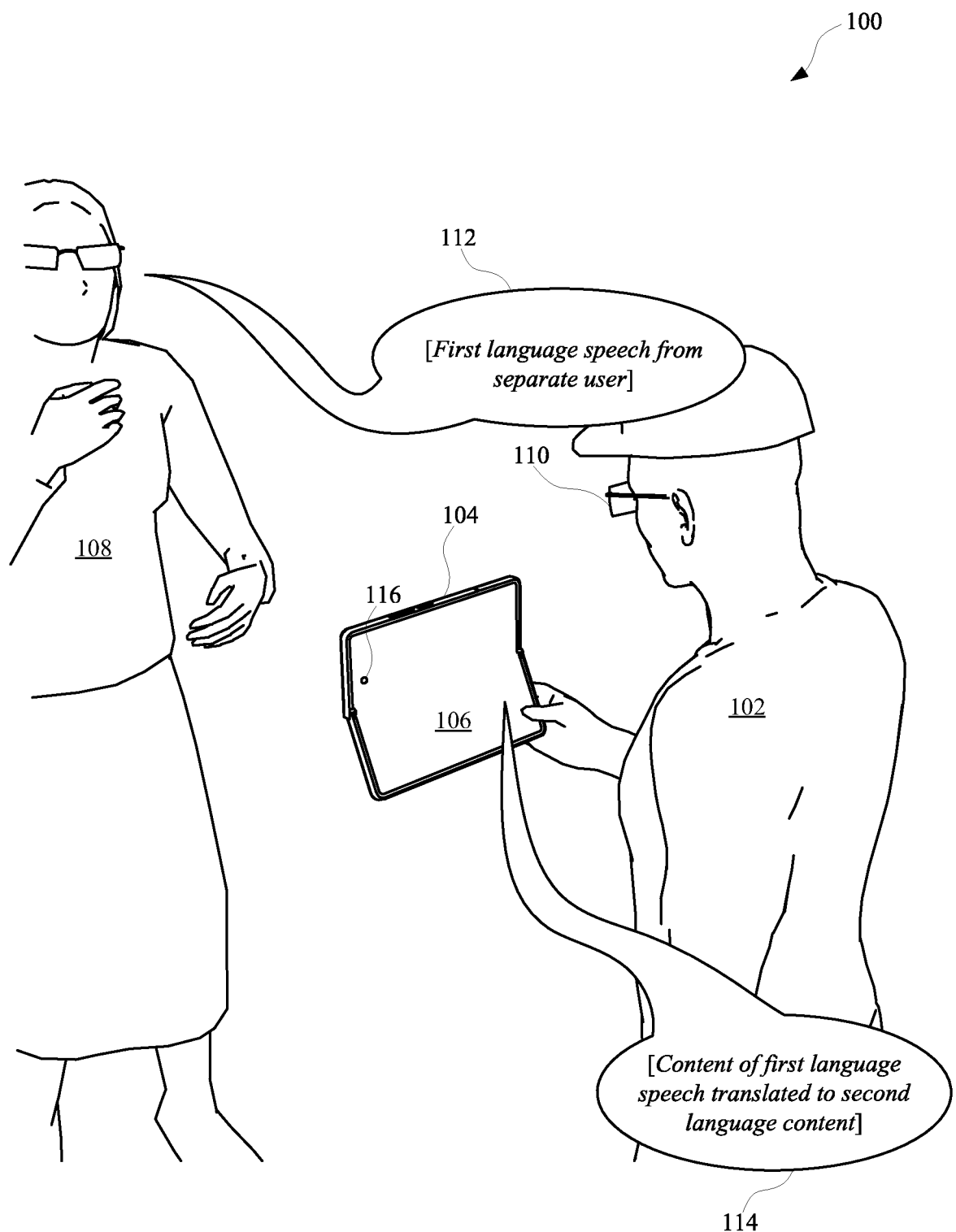
FIG. 1A, FIG. 1B, and FIG. 1C illustrate views of a user participating in a multilingual conversation that is being facilitated by a translation feature and foldable display interface of a computing device.
Figure 1B:
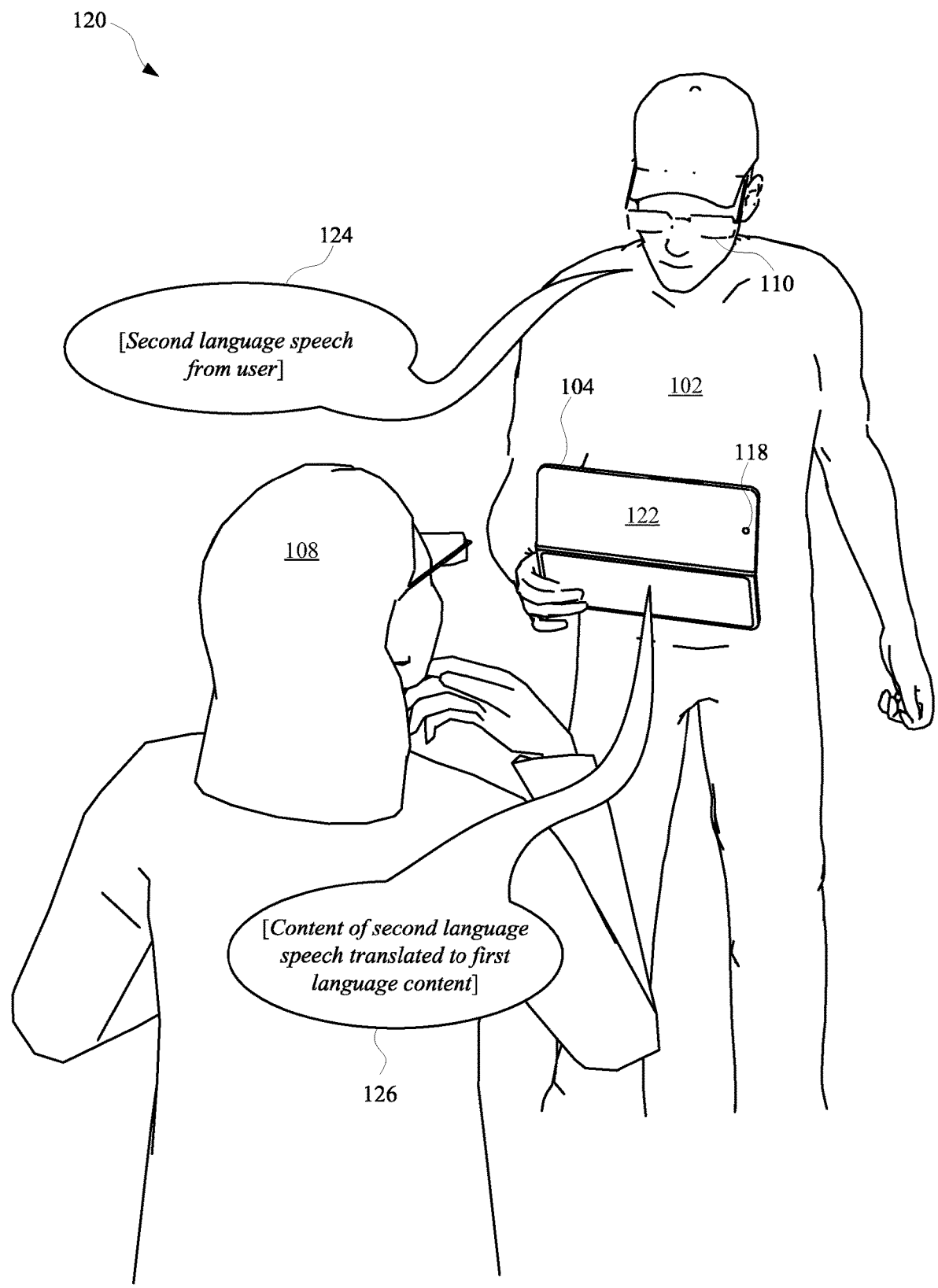
Figure 1C:
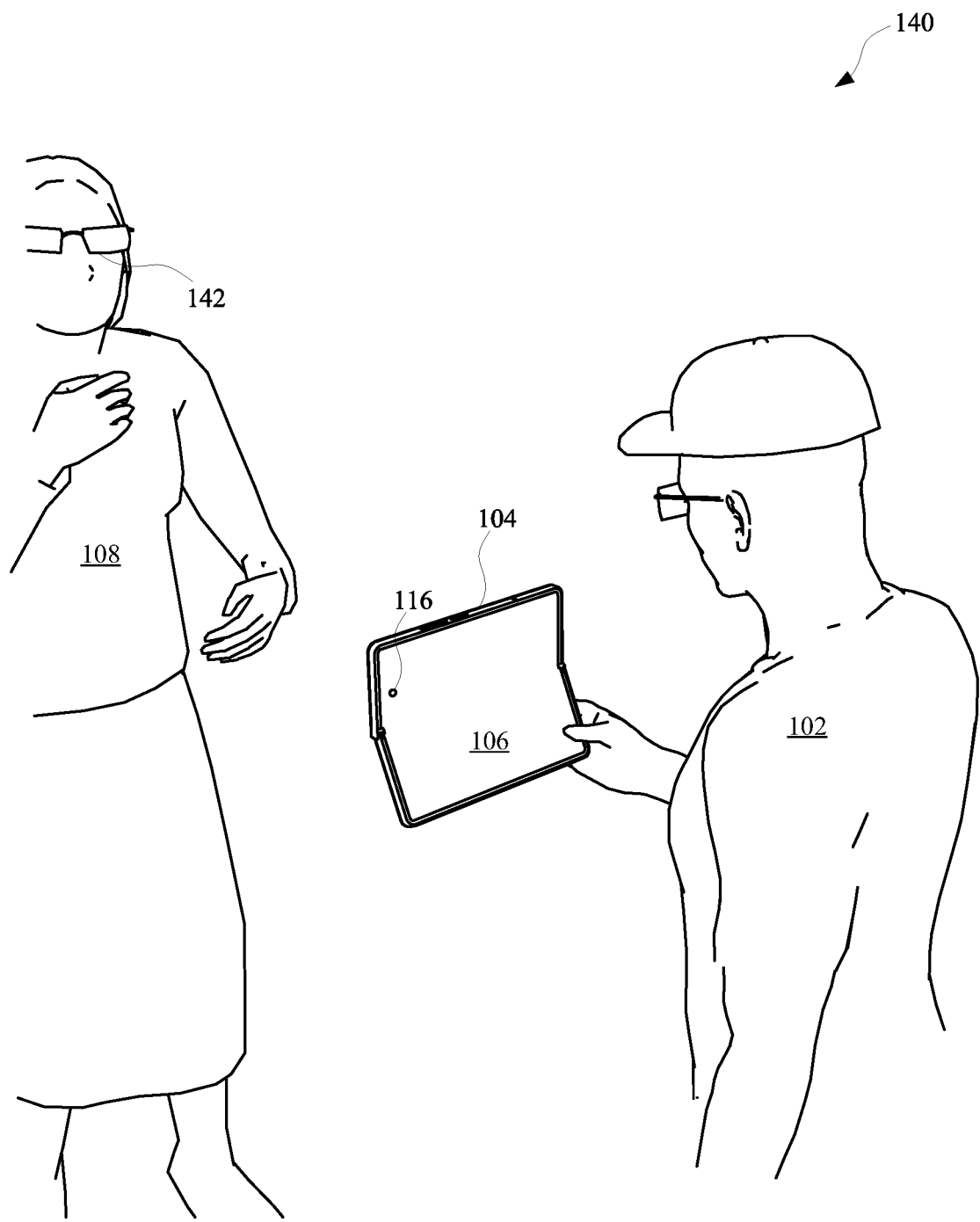

FIG. 1A, FIG. 1B, and FIG. 1C illustrate a view 100, a view 120, and a view 140, of a user 102 participating in a multilingual conversation that is being facilitated by a translation feature and foldable display interface of a computing device 104. The foldable display interface can include a first portion 106 and a second portion 122, which can be coplanar when the foldable display interface is not in a folded arrangement, and can be parallel when the foldable display interface is in the folded arrangement. In some implementations, the foldable display interface can be folded manually by the user 102 and/or electromechanically folded by an operation of the computing device 104. In some implementations, the first portion 106 of the foldable display interface can have a first camera 116, and the second portion 122 of the foldable display interface can have a second camera 118. In this way, when the computing device 104 is in the unfolded arrangement, and as arranged in in FIG. 1A, the first camera 116 can be directed more towards a direction of the user 102 than another direction of the separate user 108. Alternatively, or additionally, when the computing device 104 is in the unfolded arrangement, and as arranged in FIG. 1B, the second camera 118 can be directed more towards a direction of the separate user 108 than another direction of the user 102.

In some implementations, the computing device 104 can be in communication with computerized glasses 110 worn by the user 102. The computerized glasses 110 can include a display interface located at the lenses of the computerized glasses 110 and one or more cameras. During multilingual conversations, the computing device 104 can communicate with the computerized glasses 110 to display translations of speech provided during the multilingual conversation between the user 102 and the separate user 108. In this way, the foldable display interface of the computing device 104 can preserve computational resources by leveraging some functionality at the computerized glasses 110.

In some implementations, the computing device 104 and/or an application of the computing device 104 can determine that the user 102 is seeking to initialize a translation operation of the computing device 104 based on one or more inputs to the computing device 104. For example, when the user 102 folds or unfolds the computing device 104, an automated assistant application or other application of the computing device 104 can receive an input indicating that the user is intending to initialize a translation operation. Alternatively, or additionally, the automated assistant and/or other application of the computing device 104 can detect, with prior permission from the user 102, that the user 102 is engaged in a multilingual conversation with a separate user 108. This determination can be based on data from one or more sensors of the computing device 104, such as a microphone and/or a camera of the computing device 104.

When the multilingual translation operation has been initialized, first language speech 112 from the separate user 108 can be detected in audio captured by a microphone of the computing device 104. The audio can be processed and converted into natural language content that can be translated into second language content 114. The second language content 114 can then be rendered at the first portion 106 of the foldable display interface that is facing more in a direction of the user 102. In some implementations, processing of audio in furtherance of generating translated text can be performed using other data, such as image data, to identify certain audio that should be filtered out. For example, image data captured by one or more cameras of the computing device 104 can be processed to determine whether the user 102 and/or the separate user 108 is exhibiting a visual speech characteristic (e.g., any indicator of active speech) when captured audio includes natural language content. The image data can indicate that a user is actively speaking when a mouth of the user is moving, and/or the user is otherwise gesturing in a way that indicates they are communicating.

The time in which such activity is observed can be compared to audio, captured by a microphone of the computer device 104, to determine whether speech was apparent in the audio. When such activity is observed in the image data, but speech is apparent in the audio, the translation operation can bypass translating the corresponding speech in the audio. However, when such activity is observed in the image data and speech is also apparent in the audio, the translation operation can translate the speech from the audio and render translated content at a suitable portion of the display interface. In some implementations, a score for speech activity observed in the image data can be generated and compared with other scores for other indicators for the speech from a user. For example, audio data can be processed to determine whether a voice signature of a user is apparent in the audio data, and another score can be generated to characterize a likelihood that the voice signature corresponds to the user. When the score for the speech activity is low but the other score for the voice signature is high, the translation operation can proceed with providing translated content at the foldable display interface, despite a low likelihood that visual speech activity is being detected for a user. In this way, multilingual conversations can be translated more accurately to include relevant portions of conversations without being interrupted by false positives.

In some implementations, the foldable display interface can dynamically adapt to features of a particular multilingual conversation occurring between a user 102 and a separate user 108. For example, an automated assistant application of the computing device 104 can determine that the user 102 (i.e., a first user), and owner of the computing device 104, is providing second language speech 124 during a multilingual conversation with the separate user 108 (i.e., a second user). In some implementations, this can be determined based on audio data and/or image data captured by the computing device 104 and/or another device, with prior permission from the user 102. In response, a multiple party translation operation can be initialized, and first language content 126 translated based on the second language speech 124 from the user 102 can be rendered at the second portion 122 of the foldable display interface. While the automated assistant is assisting with the multilingual conversation, the automated assistant can cause the computing device 104 to enter a limited mode in which there is a limit on a responsiveness to touch inputs at the second portion 122 of the foldable display. However, in the limited mode, the first portion 106 of the foldable display interface can remain responsive to touch inputs so that the user 102 can still interact with their computing device 104 during the multilingual conversation. This can limit interruptions to translation operations in circumstances when the second portion 122 of the portable display interface may be subject to touch inputs that are unrelated to the multilingual conversation. When the automated assistant application determines that the multilingual conversation has been over for a threshold direction of time, the automated assistant application can cause the second portion 122 of the foldable display interface to become responsive to touch inputs again. Alternatively, or additionally, when the user 102 modifies an arrangement of the foldable display interface to no longer be in an unfolded arrangement (e.g., transitioning from an unfolded arrangement to a folded arrangement), the automated assistant application can cause the second portion 122 of the foldable display interface to be responsive to touch inputs again.

In some implementations, an application of the computing device 104 can cause a brightness setting of the foldable display interface to be adjusted such that the first portion 106 exhibits less brightness when the user 102 is speaking during a multilingual conversation. Alternatively, or additionally, the application can cause a brightness setting of the foldable display interface to be adjusted such that the second portion 122 exhibits less brightness when the separate user 108 is speaking during a multilingual conversation. In this way, each user can be put on notice of when their speech is being translated for the other user. This can result in time savings for multilingual conversations, thereby streamlining translation operations and reducing consumption of computational resources. In some implementations, when the user 102 is determined to be wearing computerized glasses 110, the first portion 106 of the foldable display interface can exhibit a lowered brightness level while the display interface of the computerized glasses 110 renders translated speech from the separate user 108. As a result, computational resources of the computing device 104 can be preserved during translation of multilingual conversations, since the computerized classes may consume less energy than larger display interfaces. Alternatively, or additionally, when the separate user 108 is determined to be wearing computerized glasses 142, as illustrated in FIG. 1C, the second portion 122 of the foldable display interface can exhibit a lowered brightness level while the display interface of the computerized glasses 142 renders translated speech from the user 102. In some implementations, this determination can be based on processing image data and/or other data that can indicate the separate user 108 is wearing the computerized glasses 142.

Figure 2:
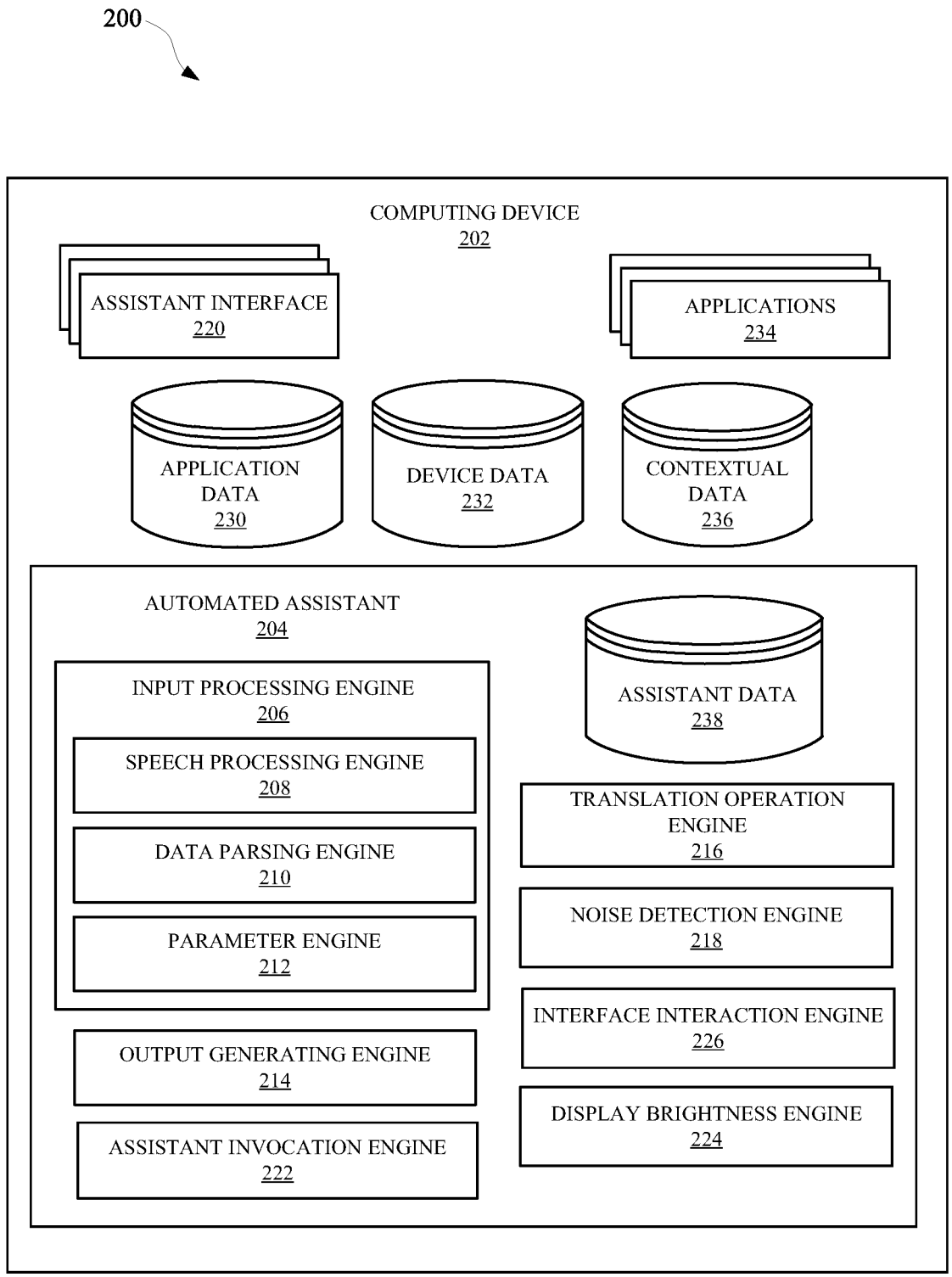
FIG. 2 illustrates a system that provides an automated assistant that can adapt settings of a foldable display interface of a computing device according to user interactions occurring during a multilingual conversation.

FIG. 2 illustrates a system 200 that provides an automated assistant 204 that can adapt settings of a foldable display interface of a computing device according to user interactions occurring during a multilingual conversation. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a translation operation engine 216 that can determine when a user is intending to initialize a translation operation based on one or more inputs received by the automated assistant 204. For example, the user can initialize a translation operation by providing a spoken utterance to the automated assistant 204 such as, "Assistant, translate this conversation for me." In response, the translation operation engine 216 can perform a translation operation for translating speech from the user and one or more other users according to any detected language(s) apparent in the conversation. In some implementations, the translation operation can be initialized in response to the automated assistant 204, or other application 234, detecting that the user has modified an arrangement of the computing device 202 to be in a folded arrangement from an unfolded arrangement, or to be in an unfolded arrangement from a folded arrangement. In response, the translation operation engine 216 can cause a portion of a folded display interface to render translated speech from the user and another portion of the folded display interface to render other translated speech from another user participating in the conversation.

In some implementations, the system 200 can include a noise detection engine 218 for determining whether certain noise should be filtered out of audio captured by one or more microphones of the computing device 202. The noise detection engine 218 can process audio data and/or image data for determining whether active speech from a participant of the conversation is being utilized as a basis for rendered translations. For example, image data from a camera facing the user, and from another camera facing another participant to the conversation, can be processed to determine when each participant is exhibiting active speech characteristics (e.g., moving their mouth, performing other communication gestures, etc.). Durations of time corresponding to these detected speech characteristics can be utilized for determining the portions of audio that should be processed for translations. For example, when neither user is exhibiting any active speech characteristics, audio corresponding to that duration of time can be avoided when identifying conversational speech to be translated. However, when image data indicates that a user is exhibiting active speech characteristics, the duration of time during such activity can be utilized for isolating a portion of audio data to be processed and translated into translated text content to be rendered at the display interface of the computing device 202.

In some implementations, the system 200 can include an interface interaction engine 226 for controlling certain features of certain interfaces of the computing device 202 and/or another computing device before, during, and/or after multiple party translation operations. For example, the interface interaction engine 226 can determine that the computing device 202 is in communications with computerized glasses or another wearable computing device. Based on this determination, the interface interaction engine 226 can cause some amount of translated content to be rendered at the computerized glasses, or other device, during the translation operation. For example, when the user is in a multilingual conversation with another person, speech from the other person can be translated to text that can be rendered at the computerized glasses. Simultaneously, any speech from the user can be translated into a language of the other person and rendered at a portion of a foldable display interface of the computing device 202 that is facing more in a direction of the other person. The portion of the foldable display interface that is facing more in a direction of the user wearing the computerized glasses can be caused to lower in brightness, shut off, or otherwise have limited operations, to conserve energy at the computing device 202. In some implementations, the interface interaction engine 226 can cause the portion of the foldable display interface facing another person (e.g., not the owner of the computing device 202) to operate in a limited mode, for limiting an ability of the other person to provide inputs to the computing device 202 during translation operations. For example, the portion of the foldable display interface can be limited by the interface interaction engine 226 to not be responsive to touch inputs or other gestures, thereby preventing the other person from interrupting the translation operation.

In some implementations, the system 200 can include a display brightness engine 224 that can control an amount of brightness exhibited by the foldable display interface during translation operations. For example, during a translation operation, and when the foldable display interface is in a folded arrangement or an unfolded arrangement, the display brightness engine 224 can determine the conversation participant who is speaking at a given time. Based on this determination, the display brightness engine 224 can cause a portion of the display interface that is facing a different participant(s) to exhibit a greater brightness than the other portion that is facing the participant who is speaking. Changes to the brightness of different portions of the display interface can be dynamically adapted during the multilingual conversation to indicate when a particular user is speaking and to also emphasize that translated content is being rendered at the display interface.

Figure 3:
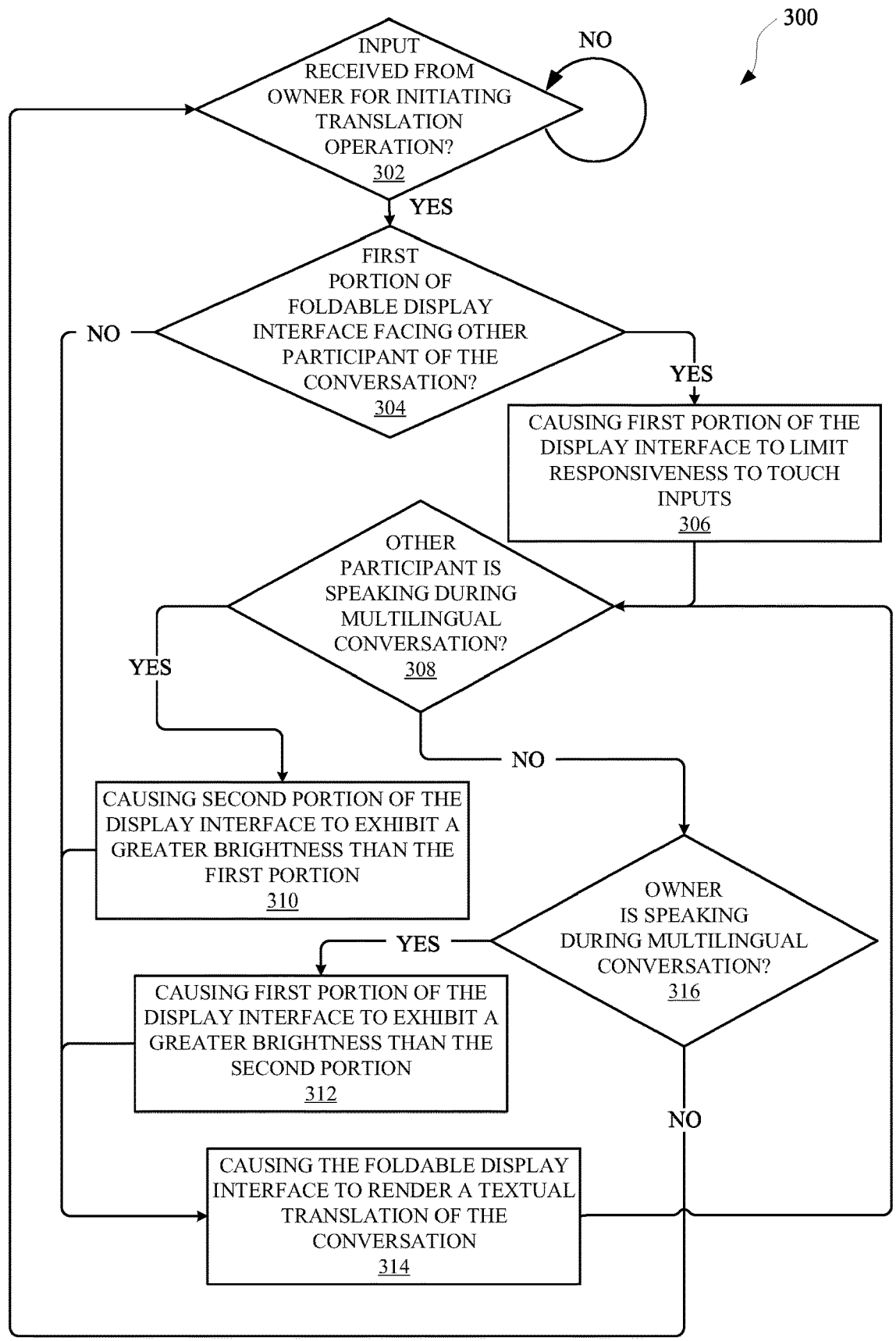
FIG. 3 illustrates a method for performing a translation operation at a computing device with a foldable display interface and modifying brightness and/or touch input settings according to whether active speech is detected during a multilingual conversation.

FIG. 3 illustrates a method 300 for performing a translation operation at a computing device with a foldable display interface and modifying brightness and/or touch input settings according to whether a particular participant in a multilingual conversation is actively speaking. The method 300 can be performed by one or more computing devices, applications, and/or any other apparatus or module that can be associated with an automated assistant. The method 300 can include an operation 302 of determining whether an input has been received from an owner of a computer device for initiating a translation operation. The owner can be anyone operating the computing device with prior permission from a legitimate owner of the computing device. The competing device can be a portable device with a foldable display interface with one more cameras and one or more microphones for generating data that can indicate a context of the computing device. The input for initiating the translation operation can be a touch input from the user, a change to a folded arrangement, or an unfolded arrangement, of the computing device, a spoken input from the user to an automated assistant, and/or any other input that can indicate that the user would like to initiate the translation operation. The translation operation can be an operation in which audio corresponding to speech from at least two users is translated and resulting translated content is rendered at the foldable display interface.

When an input is determined to have been received for initiating the translation operation, the method 300 can proceed from the operation 302 to an operation 304. Otherwise, the application or device performing the method 300 can continue to perform the operation 302. The operation 304 can include determining whether a first portion of the foldable display interface is facing the other participant (not the owner) of the multilingual conversation. In some implementations, this determination can be based on data generated at the computing device and/or otherwise available to the computing device. For example, a camera at the first portion of the foldable display interface can generate image data that can be processed to determine whether the first portion of the foldable display interface is facing the other user and/or whether the other user is present. In some implementations, this determination can be further based on whether the other user is determined to be facing the owner and/or whether the other user is determined to be located within a threshold distance of the owner.

When the first portion of the foldable display interface is determined to be facing the other participant of the multilingual conversation, the method 300 can proceed from the operation 304 to an operation 306. Otherwise, the method 300 can proceed from the operation 304 to an operation 314. The operation 306 can include causing the first portion of the display interface to limit responsiveness to touch inputs. In other words, the first portion of the display interface that is facing the other participant in the multilingual conversation may not be responsive to certain inputs, such as touch inputs and/or other gestures. However, a second portion of the display interface can remain responsive to inputs, thereby allowing the owner to interact with their computing device during the multilingual conversation.

The method 300 can proceed from the operation 306 to an operation 308, which can include determining whether the other participant is speaking during the multilingual conversation and/or translation operation. When the other participant is determined to be speaking during the multilingual conversation, the method 300 can proceed from the operation 308 to an operation 310. The operation 310 can include causing the second portion of the display interface to exhibit a greater brightness than the first portion. In this way, a brightness level of the display interface can indicate the user who is speaking and/or whose speech is being translated during the translation operation. The method 300 can then proceed from the operation 310 to the operation 314.

When the other participant is determined to not be speaking during the multilingual conversation, the method 300 can proceed from the operation 308 to an operation 316. The operation 316 can include determining whether the owner is speaking during the multilingual conversation and/or translation operation. When the owner is determined to be speaking during the multilingual conversation, the method 300 can proceed from the operation 316 to an operation 312. The operation 312 can include causing the first portion of the display interface to exhibit a greater brightness than the second portion. In this way, the brightness level at the portion of the display interface facing the other user can increase in brightness to improve readability of the translated content. The method 300 can then proceed from the operation 312 to an operation 314. Alternatively, when the owner is determined to not be speaking during the multilingual conversation, the method 300 can proceed from the operation 316 and return to the operation of 302.

The operation 314 can include causing the display interface to render a translation of the multilingual conversation. In other words, textual content characterizing a translation of speech from the owner of the computer device and/or the other participant to the multilingual conversation can be rendered at the foldable display interface. The textual content can be translated according to a detected language being utilized by the owner and/or the other participant to the conversation. For example, the owner can be communicating in Spanish while the other participant can be communicating in German, therefore content of speech from the owner can be translated into German and rendered at the first portion of the display interface that is facing the other participant. Alternatively, or additionally, content of speech from the other participant can be translated into Spanish and rendered at the second portion of the display interface that is facing the owner. The method 300 can then proceed from the operation 314 and return to the operation 308 and/or the operation 316 in furtherance of determining whether the multilingual conversation is ongoing.

Figure 4:
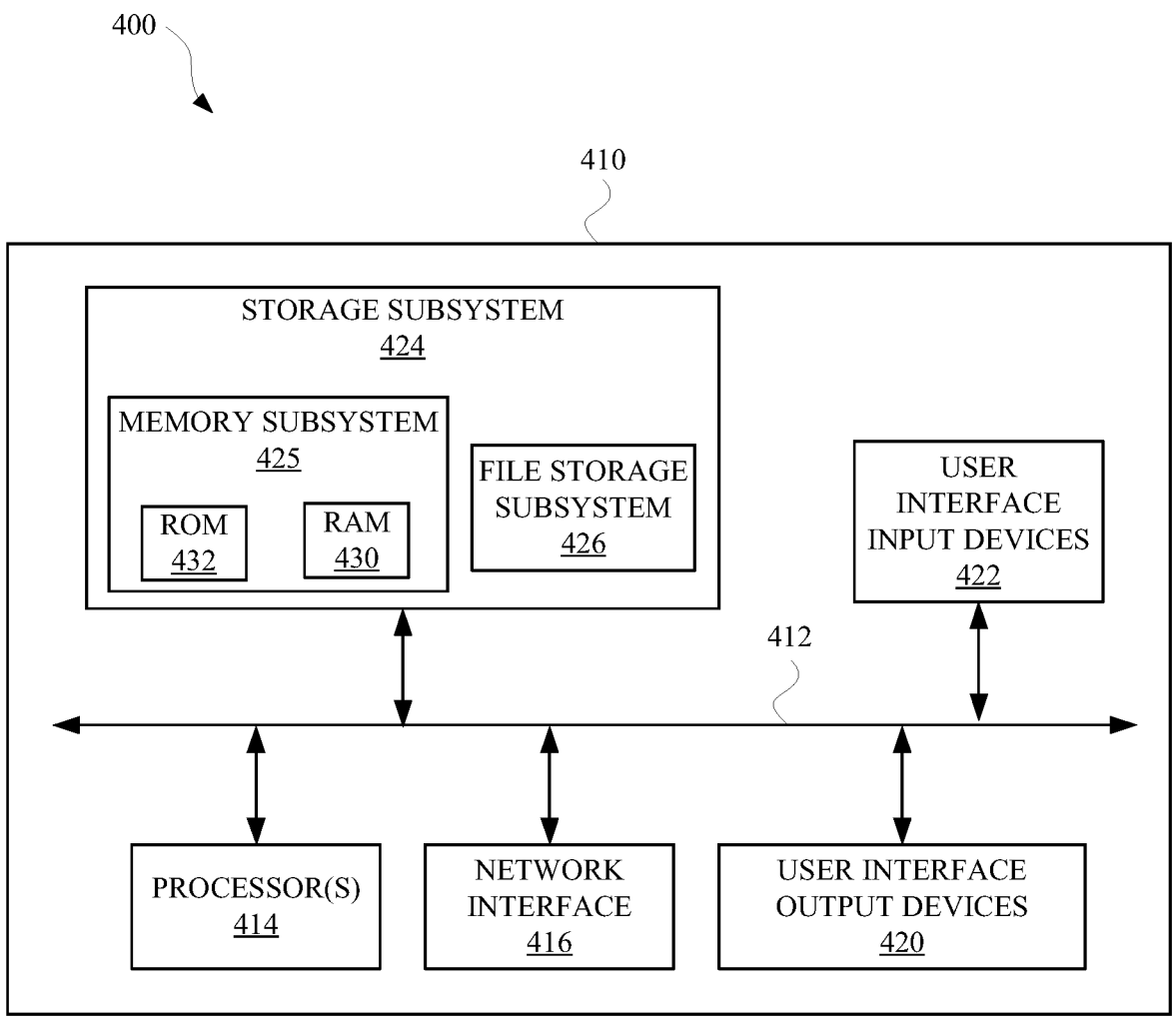
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, computerized glasses 142, computerized glasses 110, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a first user has provided an input to a computing device in furtherance of causing the computing device to operate a multiple party translation operation, wherein the multiple party translation operation causes a multilingual conversation, between at least the first user and a second user, to be translated by an application of the computing device according to any languages apparent in the multilingual conversation. The method can further include determining, in response to the input from the first user, that a portion of a display interface of the computing device is facing more in a direction of the first user than in an alternate direction of the second user. The method can further include causing, based on determining that the portion of the display interface is facing more in the direction of the first user, the portion of the display interface of the computing device to render natural language content translated from speech from the second user involved in the multilingual conversation. The method can further include causing, based on determining that the portion of the display interface is facing more in the direction of the first user, an additional portion of the display interface of the computing device to operate in a limited mode, wherein in the limited mode an ability, of the second user to provide a touch input to the additional portion of the display interface while the multiple party translation operation is being performed, is limited.

In some implementations, the display interface is foldable between the portion and the additional portion, and the method further includes: processing image data that is captured using a camera that is located at the portion of the display interface and that faces away from the additional portion of the display interface when the display interface is in a folded arrangement, wherein determining that the portion of the computing device is facing more in the direction of the first user than the second user is performed based on processing the image data. In some implementations, the display interface is foldable between the portion and the additional portion, and wherein determining that the first user has provided the input to the computing device in furtherance of causing the computing device to operate the multiple party translation operation includes: determining that the first user modified an arrangement of the display interface from either an unfolded arrangement to a folded arrangement, or from a folded arrangement to an unfolded arrangement, wherein modifying the arrangement causes the input to be provided to the application that facilitates the multiple party translation operation.

In some implementations, the display interface is foldable between the portion and the additional portion, and the method further includes: processing image data that is captured using a camera that is located at the portion of the display interface and faces away from the portion of the display interface when the display interface is in a folded arrangement. In some implementations, the method can further include determining, based on processing the image data, whether the first user is wearing computerized glasses during the multiple party translation operation, wherein causing the portion of the display interface to render the natural language content translated from the speech from the second user is performed in response to determining that the first user is not wearing the computerized glasses during the multiple party translation operation. In some implementations, the display interface is foldable between the portion and the additional portion, and the method further includes: processing image data that is captured using a camera that is located at the portion of the display interface and faces away from the additional portion of the display interface when the display interface is in an unfolded arrangement. In some implementations, the method can further include determining, based on processing the image data, whether the second user is wearing computerized glasses during the multiple party translation operation; and causing, in response to determining that the second user is not wearing the computerized glasses during the multiple party translation operation, the additional portion of the display interface to render other natural language content translated from other speech from the first user.

In some implementations, the method can further include causing, in response to determining that the second user is wearing the computerized glasses during the multiple party translation operation, the computerized glasses to render the other natural language content translated from the other speech from the first user. In some implementations causing the computerized glasses to render the other natural language content includes: providing, by the computing device, the computerized glasses with language data that indicates a natural language that the first user is using to speak with the second user. In some implementations, causing the computerized glasses to render the other natural language content includes: providing, by the computing device, the computerized glasses with language data that indicates the other natural language content translated from a first language, spoken by the first user, to a second language, spoken by the second user.

In some implementations, a method implemented by one or more processors is set forth as including operations such as causing, by an automated assistant application, a multiple party translation operation to be initiated at a computing device that includes a foldable display interface, wherein the multiple party translation operation causes a multilingual conversation, between at least two users, to be translated according to any languages detected by the automated assistant application during the multilingual conversation. The method can further include determining, based on audio data captured by one or more microphones of the computing device, that active speech is occurring during the multilingual conversation. The method can further include determining, based on the audio data, and image data captured by a camera that is facing a user of the at least two users, whether the user is exhibiting a visual speech characteristic when the active speech is determined to be occurring. The method can further include causing, in response to determining that the user is not exhibiting the visual speech characteristic when the active speech is occurring, a portion of the foldable display interface to omit natural language content characterizing the active speech, wherein the portion of the foldable display interface is facing more in a direction of a separate user of the at least two users than in an alternate direction of the user. The method can further include causing, in response to determining that the user is exhibiting the visual speech characteristic when the active speech is occurring, the portion of the foldable display interface of the computing device to render the natural language content characterizing the active speech.

In some implementations, the method can further include causing, in response to determining that the one or more persons are speaking when the user is not exhibiting the visual speech characteristic, the portion of the foldable display interface to decrease in brightness, wherein the visual speech characteristic includes a motion of a mouth of the user. In some implementations, the method can further include causing, in response to determining that the one or more persons are speaking when the user is not exhibiting the visual speech characteristic, the portion of the foldable display interface to decrease in brightness, and an additional portion of the foldable interface to remain at a constant brightness or exhibit a change in brightness that is different from the decrease in brightness exhibited by the portion of the foldable display interface, wherein the additional portion of the foldable interface is facing more in the alternate direction of the user than the direction of the separate user. In some implementations, the method can further include causing, in response to determining that the one or more persons are speaking when the user is exhibiting the visual speech characteristic, the portion of the foldable display interface to increase in brightness.

In some implementations, a method implemented by one or more processors is set forth as including operations such as causing, by an automated assistant application, a multiple party translation operation to be initiated at a computing device that includes a foldable display interface, wherein the multiple party translation operation causes a multilingual conversation, between at least two users, to be translated according to any languages detected by the automated assistant application during the multilingual conversation. The method can further include determining, based on audio data captured by a microphone that is connected to the computing device, and/or image data captured by a camera that is facing a user of the at least two users, that the user is actively speaking during the multilingual conversation, wherein the foldable display interface includes: a portion that is facing more in a direction of the user, and an additional portion that is facing more in an alternate direction of a separate user of the at least two users. The method can further include causing, in response to determining that the user is actively speaking during the multilingual conversation, a brightness setting of the foldable display interface to effectuate an increase in brightness at the additional portion of the foldable display interface. The method can further include causing, in response to determining that the user is actively speaking during the multilingual conversation, the additional portion of the foldable display interface of the computing device to render natural language content characterizing active speech from the user.

In some implementations, the method can further include causing, in response to determining that the user is actively speaking during the multilingual conversation, another brightness setting of the foldable display interface to effectuate a decrease in brightness at the portion of the foldable display interface. In some implementations, the method can further include determining, based on the audio data and/or the image data, that the user or the separate user is obstructing the microphone that is connected to the computing device; and causing, in response to determining that the user or the separate user is obstructing the microphone, the computing device to render haptic feedback in furtherance of causing the user or the separate user to no longer obstruct the microphone. In some implementations, the method can further include determining, based on the audio data and/or the image data, that there is an obstruction to the microphone that is connected to the computing device; and causing, in response to determining that the user or the separate user is obstructing the microphone, the computing device to render visual feedback at the foldable display interface in furtherance of causing the user or the separate user to remedy the obstruction to the microphone.

In some implementations, the method can further include determining, based on the audio data and/or the image data, that the user is no longer actively speaking during the multilingual conversation; and causing, in response to determining that the user is no longer actively speaking during the multilingual conversation, the brightness setting of the foldable display interface to effectuate a decrease in brightness at the additional portion of the foldable display interface. In some implementations, the method can further include determining, based on the audio data and/or the image data, that the user who is actively speaking during the multilingual conversation is an owner of the computing device; and causing, in response to determining that the user is the owner of the computing device, the additional portion of the foldable display interface to operate in a limited mode, wherein in the limited mode an ability, of the separate user to provide a touch input to the additional portion of the foldable display interface while the multiple party translation operation is being performed, is limited. In some implementations, the method can further include causing, in response to determining that the user is the owner of the computing device, the portion of the foldable display interface to be responsive to touch inputs from the user while the multiple party translation operation is being performed. In some implementations, causing the brightness setting of the foldable display interface to effectuate the increase in brightness at the additional portion of the foldable display interface causes the brightness at the additional portion to be the same or greater to a separate brightness of the portion of the foldable display interface that is facing more in the direction of the user.

We claim:

1. A method implemented by one or more processors, the method comprising:
    determining that a first user has provided an input to a computing device in furtherance of causing the computing device to operate a multiple party translation operation,
        wherein the multiple party translation operation causes a multilingual conversation, between at least the first user and a second user, to be translated by an application of the computing device according to any languages apparent in the multilingual conversation;
    determining, in response to the input from the first user, that a portion of a display interface of the computing device is facing more in a direction of the first user than in an alternate direction of the second user;
    causing, based on determining that the portion of the display interface is facing more in the direction of the first user, the portion of the display interface of the computing device to render natural language content translated from speech from the second user involved in the multilingual conversation; and
    causing, based on determining that the portion of the display interface is facing more in the direction of the first user, an additional portion of the display interface of the computing device to operate in a limited mode, wherein in the limited mode an ability, of the second user to provide a touch input to the additional portion of the display interface while the multiple party translation operation is being performed, is limited.

2. The method of claim 1, wherein the display interface is foldable between the portion and the additional portion, and the method further includes:
    processing image data that is captured using a camera that is located at the portion of the display interface and that faces away from the additional portion of the display interface when the display interface is in a folded arrangement,
        wherein determining that the portion of the display interface is facing more in the direction of the first user than the second user is performed based on processing the image data.

3. The method of claim 1,
    wherein the display interface is foldable between the portion and the additional portion, and
    wherein determining that the first user has provided the input to the computing device in furtherance of causing the computing device to operate the multiple party translation operation includes:
        determining that the first user modified an arrangement of the display interface from either an unfolded arrangement to a folded arrangement, or from a folded arrangement to an unfolded arrangement, wherein modifying the arrangement causes the input to be provided to the application that facilitates the multiple party translation operation.

4. The method of claim 1, wherein the display interface is foldable between the portion and the additional portion, and the method further includes:
processing image data that is captured using a camera that is located at the portion of the display interface and faces away from the additional portion of the display interface when the display interface is in a folded arrangement; and
determining, based on processing the image data, whether the first user is wearing computerized glasses during the multiple party translation operation,
wherein causing the portion of the display interface to render the natural language content translated from the speech from the second user is performed in response to determining that the first user is not wearing the computerized glasses during the multiple party translation operation.

5. The method of claim 1, wherein the display interface is foldable between the portion and the additional portion, and the method further includes:
processing image data that is captured using a camera that is located at the portion of the display interface and faces away from the additional portion of the display interface when the display interface is in an unfolded arrangement;
determining, based on processing the image data, whether the second user is wearing computerized glasses during the multiple party translation operation; and
causing, in response to determining that the second user is not wearing the computerized glasses during the multiple party translation operation, the additional portion of the display interface to render other natural language content translated from other speech from the first user.

6. The method of claim 5, further comprising:
causing, in response to determining that the second user is wearing the computerized glasses during the multiple party translation operation, the computerized glasses to render the other natural language content translated from the other speech from the first user.

7. The method of claim 6, wherein causing the computerized glasses to render the other natural language content includes:
providing, by the computing device, the computerized glasses with language data that indicates a natural language that the first user is using to speak with the second user.

8. The method of claim 6, wherein causing the computerized glasses to render the other natural language content includes:
providing, by the computing device, the computerized glasses with language data that indicates the other natural language content translated from a first language, spoken by the first user, to a second language, spoken by the second user.

9. A method implemented by one or more processors, the method comprising:
causing, by an automated assistant application, a multiple party translation operation to be initiated at a computing device that includes a foldable display interface,
wherein the multiple party translation operation causes a multilingual conversation, between at least two users, to be translated according to any languages detected by the automated assistant application during the multilingual conversation;
determining, based on audio data captured by one or more microphones of the computing device, that active speech is occurring during the multilingual conversation;
determining, based on the audio data, and image data captured by a camera that is facing a user of the at least two users, whether the user is exhibiting a visual speech characteristic when the active speech is determined to be occurring;
causing, in response to determining that the user is not exhibiting the visual speech characteristic when the active speech is occurring, a portion of the foldable display interface to omit natural language content characterizing the active speech,
wherein the portion of the foldable display interface is facing more in a direction of a separate user of the at least two users than in an alternate direction of the user; and
causing, in response to determining that the user is exhibiting the visual speech characteristic when the active speech is occurring, the portion of the foldable display interface of the computing device to render the natural language content characterizing the active speech.

10. The method of claim 9, further comprising:
causing, in response to determining that one or more persons are speaking when the user is not exhibiting the visual speech characteristic, the portion of the foldable display interface to decrease in brightness,
wherein the visual speech characteristic includes a motion of a mouth of the user.

11. The method of claim 9, further comprising:
causing, in response to determining that one or more persons are speaking when the user is not exhibiting the visual speech characteristic, the portion of the foldable display interface to decrease in brightness, and an additional portion of the foldable interface to remain at a constant brightness or exhibit a change in brightness that is different from the decrease in brightness exhibited by the portion of the foldable display interface,
wherein the additional portion of the foldable interface is facing more in the alternate direction of the user than the direction of the separate user.

12. The method of claim 9, further comprising:
causing, in response to determining that one or more persons are speaking when the user is exhibiting the visual speech characteristic, the portion of the foldable display interface to increase in brightness.

13. A method implemented by one or more processors, the method comprising:
causing, by an automated assistant application, a multiple party translation operation to be initiated at a computing device that includes a foldable display interface,
wherein the multiple party translation operation causes a multilingual conversation, between at least two users, to be translated according to any languages detected by the automated assistant application during the multilingual conversation;
determining, based on audio data captured by a microphone that is connected to the computing device, and/or image data captured by a camera that is facing a user of the at least two users, that the user is actively speaking during the multilingual conversation, wherein the foldable display interface includes: a portion that is facing more in a direction of the user, and an additional portion that is facing more in an alternate direction of a separate user of the at least two users;

causing, in response to determining that the user is actively speaking during the multilingual conversation, a brightness setting of the foldable display interface to effectuate an increase in brightness at the additional portion of the foldable display interface; and causing, in response to determining that the user is actively speaking during the multilingual conversation, the additional portion of the foldable display interface of the computing device to render natural language content characterizing active speech from the user.

14. The method of claim 13, further comprising:

causing, in response to determining that the user is actively speaking during the multilingual conversation, another brightness setting of the foldable display interface to effectuate a decrease in brightness at the portion of the foldable display interface.

15. The method of claim 13, further comprising:

determining, based on the audio data and/or the image data, that the user or the separate user is obstructing the microphone that is connected to the computing device; and causing, in response to determining that the user or the separate user is obstructing the microphone, the computing device to render haptic feedback in furtherance of causing the user or the separate user to no longer obstruct the microphone.

16. The method of claim 13, further comprising:

determining, based on the audio data and/or the image data, that there is an obstruction to the microphone that is connected to the computing device; and causing, in response to determining that there is an obstruction to the microphone that is connected to the computing device, the computing device to render visual feedback at the foldable display interface in furtherance of causing the user or the separate user to remedy the obstruction to the microphone.

17. The method of claim 13, further comprising:

determining, based on the audio data and/or the image data, that the user is no longer actively speaking during the multilingual conversation; and causing, in response to determining that the user is no longer actively speaking during the multilingual conversation, the brightness setting of the foldable display interface to effectuate a decrease in brightness at the additional portion of the foldable display interface.

18. The method of claim 13, further comprising:

determining, based on the audio data and/or the image data, that the user who is actively speaking during the multilingual conversation is an owner of the computing device; and causing, in response to determining that the user is the owner of the computing device, the additional portion of the foldable display interface to operate in a limited mode, wherein in the limited mode an ability, of the separate user to provide a touch input to the additional portion of the foldable display interface while the multiple party translation operation is being performed, is limited.

19. The method of claim 18, further comprising:

causing, in response to determining that the user is the owner of the computing device, the portion of the foldable display interface to be responsive to touch inputs from the user while the multiple party translation operation is being performed.

20. The method of claim 19, wherein causing the brightness setting of the foldable display interface to effectuate the increase in brightness at the additional portion of the foldable display interface causes the brightness at the additional portion to be the same or greater than a separate brightness of the portion of the foldable display interface that is facing more in the direction of the user.

\* \* \* \* \*